United States Patent
Daniel

(10) Patent No.: US 7,358,506 B2
(45) Date of Patent: Apr. 15, 2008

(54) STRUCTURED X-RAY CONVERSION SCREEN FABRICATED WITH MOLDED LAYERS

(75) Inventor: Jurgen H. Daniel, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/300,870

(22) Filed: Dec. 15, 2005

(65) Prior Publication Data

US 2007/0138409 A1    Jun. 21, 2007

(51) Int. Cl.
G01T 1/00 (2006.01)

(52) U.S. Cl. ................................. 250/483.1

(58) Field of Classification Search ............. 250/483.1
See application file for complete search history.

(56) References Cited

U.S. PATENT DOCUMENTS

| | | | |
|---|---|---|---|
| 4,940,901 A * | 7/1990 | Henry et al. | 250/370.09 |
| 5,519,227 A * | 5/1996 | Karellas | 250/483.1 |
| 5,981,959 A | 11/1999 | Apte | |
| 2005/0104000 A1* | 5/2005 | Kindem et al. | 250/361 R |
| 2006/0108533 A1* | 5/2006 | McEvoy et al. | 250/367 |

OTHER PUBLICATIONS

Nishikawa, Robert and Yaffe, Martin: *Model Of The Spatial-Frequency-Dependent Detective Quantum Efficiency Of Phosphor Screens*, 1990 Am. Phys. Med., Medical Physics, vol. 17, No. 5, Sep./Oct. 1990, pp. 894-904.

Swank, Robert K.: *Absorption And Noise In X-Ray Phosphors*, 1973 American institute of Physics, J. Appl. Phys., vol. 44, No. 9, Sep. 1973, pp. 4199-4203.

Daniel, J. H., Krusor, B., Apte, R. B., Mulato, M., Van Schuylenbergh, K., Lau, R., Do, T., Street, R. A., Goredema, A., Boils-Boissier, D. C., and Kazmaier, P. M.: *Micro-Electro-Mechanical System Fabrication Technology Applied To Large Area X-Ray Image Sensor Arrays*, 2001 American_Vacuum Society, J. Vac. Sci. Technol. A, vol. 19, No. 4 Jul./Aug. 2001, pp. 1219-1233.

*Going Beyond Silicon MEMS With EFAB Technology*, White Paper, ETWP 0204, 2004 Microfabrica, Inc., www.Microfabrica.com.

*Three-Dimensional Microfabrication Technology (FORMULA)*, Fuji Xerox Co., Ltd. http://www.fujixerox.co.jp/eng/company/technical/m_fabrication/index.html.

* cited by examiner

*Primary Examiner*—David Porta
*Assistant Examiner*—Marcus H Taningco
(74) *Attorney, Agent, or Firm*—Kent Chen

(57) ABSTRACT

An improved method of forming an X-ray conversion screen is described. The method uses a mold to mold a scintillating material layer including cavities in the scintillating material layer. By repeated moldings, the phosphor layer is built up. The cavities may be filled with a pixel cell separating material or coated with a reflective material such as a sputtered metal to optically isolate each pixel. Various methods for minimizing Swank noise are also described.

21 Claims, 8 Drawing Sheets

STRUCTURED X-RAY CONVERSION SCREEN FABRICATED WITH MOLDED LAYERS

BACKGROUND

Modern indirect digital X-ray imagers typically rely on a scintillation screen to covert X-rays into visible light. The scintillation screen thickness typically depends on the X-ray energy being detected, higher energy X-ray energies necessitate thicker screens. However excessively thick screens have disadvantages. In particular, light spreading in thick phosphor screens decreases screen spatial resolution.

To minimize light spreading, scintillation screens are typically divided into cells. Such structures are described in U.S. Pat. No. 5,981,959 entitled "Pixelated Scintillation Layer and Structures Incorporating the Same" by Raj Apte and also _"Micro-electro-mechanical system fabrication technology applied to large area x-ray image sensor arrays"_by Daniel et. al. in the Journal of Vacuum Science Technology, A 19(4), 2001, Pages 1219-1223, both references hereby incorporated by reference in their entirety. In the prior art, cell walls are fabricated from SU-8 polymer (Microchem Corp.) using a photolithographic process. A reflective metal layer deposited over the cell walls renders the cell walls opaque. Reflective materials also help keep the light within the same cell. A phosphorous powder typically fills each cell. The phosphorous powder acts as a scintillation material that converts X-ray photons into light photons of energy in the visible range (e.g. green).

However fabricating the described structure is difficult and expensive. A major expense results from the difficulties associates with processing a thick photoresist. The high aspect ratio of the cells makes traditional molding techniques unsuitable for cell wall fabrication. Filling high aspect ratio cells without introducing voids has also proven difficult.

During use, the high aspect ratio cells exacerbate Swank noise problems. Swank noise results from the unequal propagation of light photons within the scintillator. In particular light generated in the conversion screen top layers do not contribute as much to the sensor signal as light generated in the conversion screen bottom layers. The effect, called Swank noise is described in an article entitled "Absorption and noise in x-ray phosphors" by R. Swank, J. of Applied Physics, Vol. 44, 1973, p 4199 and also more recently in "Effect of finite phosphor thickness on detective quantum efficiency" by Nishikawa et al., Medical Physics, 16 (5) 1989, p. 773.

Thus an improved method to form the X-ray scintillation screen and also a system for minimizing Swank noise effects is needed.

SUMMARY

A method of forming an X-ray conversion screen is described. The method involves bringing a mold in contact with a conversion screen material that includes a scintillating material such as scintillating phosphor. The mold molds a surface of the conversion screen material. An opposite side of the conversion screen material attaches to a substrate surface. When the mold is removed, cavities remain in the scintillating material layer. The cavities are positioned to separate adjacent pixels. This molded scintillating material layer is used to form a layer of the conversion screen. In one embodiment, the cavities may subsequently be filled with a material to isolate each pixel.

DETAILED DESCRIPTION

An improved method of forming scintillating material screens using molding methods is described. As used herein, scintillating materials are the materials that emit optical photons in response to ionizing radiation. Optical photons are photons with energies corresponding to wavelengths between 3,000 and 8,000 angstroms. Thus a scintillating layer converts source radiation energy, such as x-rays, into visible light energy. The visible light energy may be detected by a sensor array. Various structures used to minimize Swank noise effects in such screens will also be described.

Figure 1:
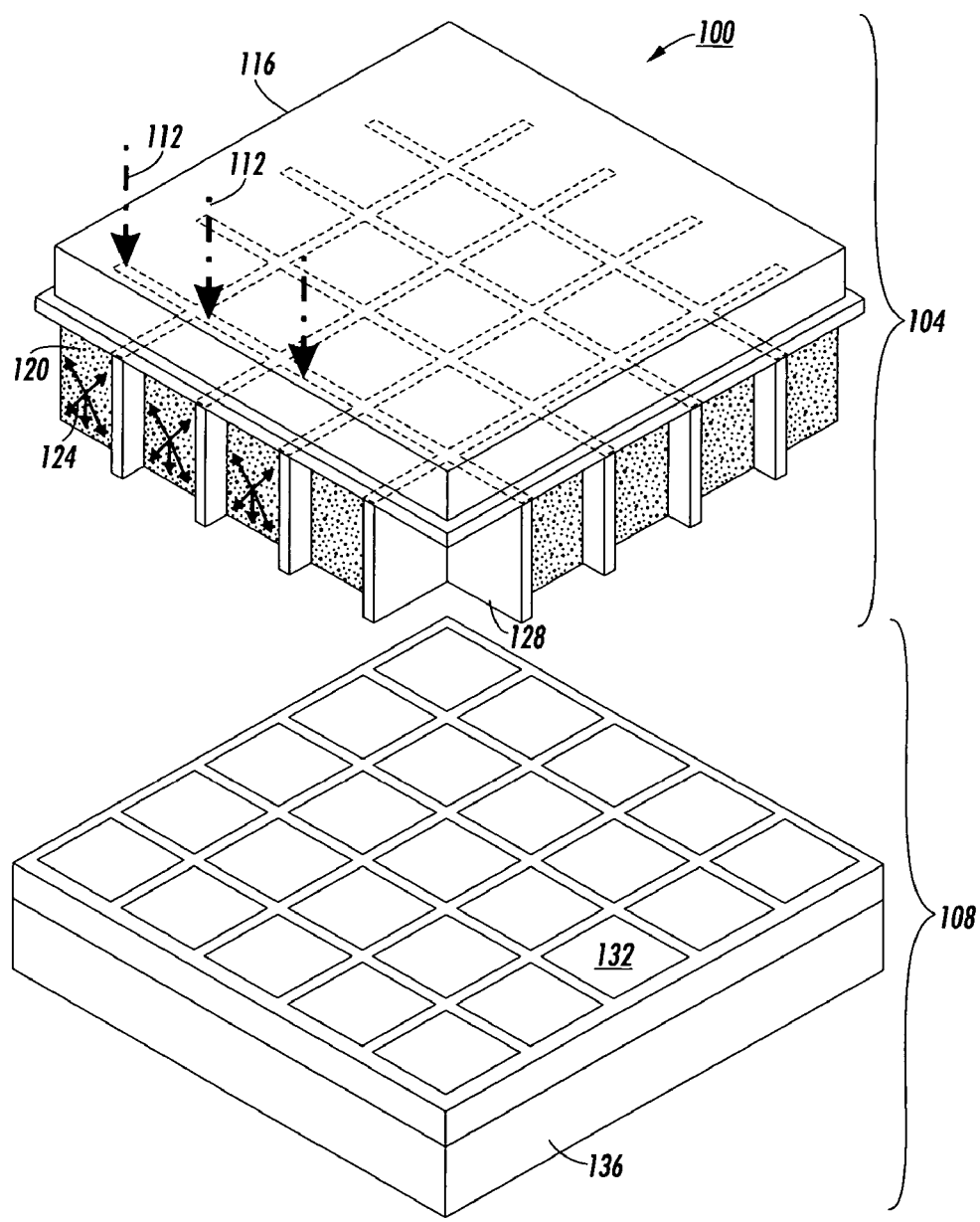
FIG. 1 shows an overall X-ray detection system including a detector array and a conversion screen.

FIG. 1 shows an X-ray detection system 100 including thin film electronics 108 and an X-ray conversion screen 104. Typically, X-rays 112 pass through an X-ray transparent layer 116 such as glass and excite a scintillating material such as scintillating phosphor media 120. The interaction between scintillating material and X-rays generates visible light photons 124.

Electronics 108 typically includes an array of detectors 132 arranged over a substrate 136. Each detector 132 is aligned with a "pixel" represented by the scintillating material in each cell. In the illustrated X-ray conversion screen 104, opaque cell walls 128 define each pixel. Light detectors 132 detect light generated by the X-ray and scintillating material interaction. In one embodiment, the detectors 132 are amorphous silicon photodiodes and substrate 136 may include a glass substrate and/or a reflective layer. Reflective layers limit the light detected by detectors 132 to photons generated by X-ray photon interactions with the scintillating material.

One problem with such detection systems is that light spreading decreases spatial resolution. Opaque cell walls 128 prevent excessive lateral light movement that results in light spreading. Thus, each detector only detects light that is generated in the pixel directly over the detector.

Figure 12:
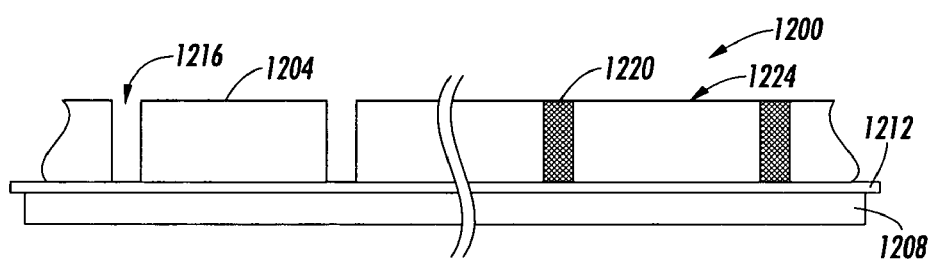
FIGS. 12-14 shows forming a conversion screen by molding layers on different substrates and then combining the individual layers to form a thicker scintillating material layer.
Figure 13:
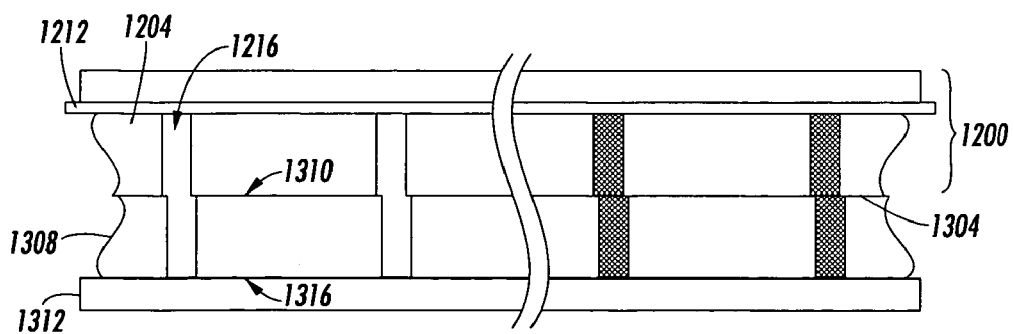
Figure 14:
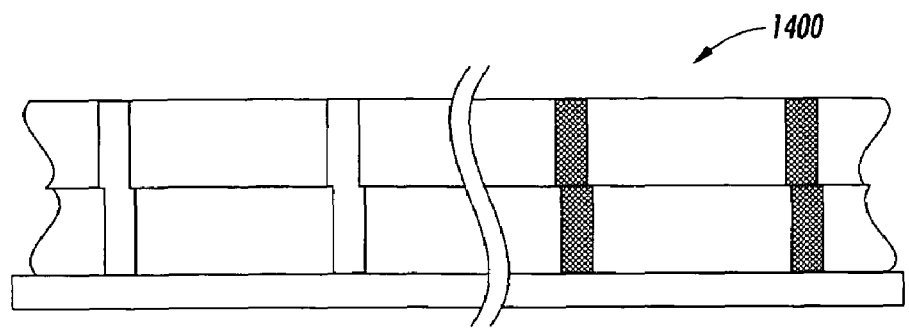

Various methods of forming the thick X-ray conversion screen, including cell walls to separate pixels, will be described. FIGS. 2-6 show one method that relies on molding a scintillating material layer and then filling molded cavities with a light blocking material. The operations are repeated to build up a thick conversion screen. FIGS. 7-11 show a variation on the method, filling the molded cavities with a sacrificial material instead of a light blocking material. FIGS. 12-14 show still another variation by fabricating individual layers on separate substrates and then combining the layers.

Figure 2:
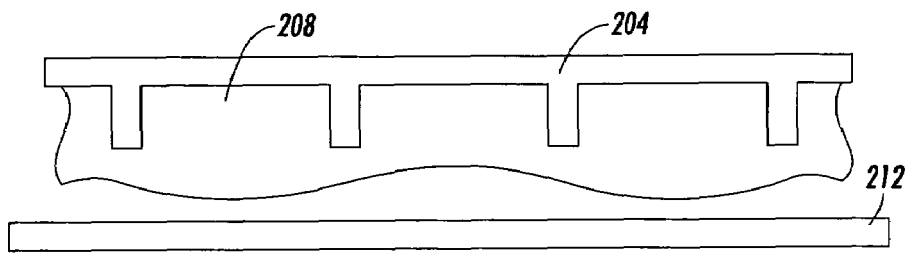
FIGS. 2-6 show one method of forming a conversion screen that relies on molding the scintillating material and then filling voids with a light blocking material.

FIGS. 2-6, provide a schematic drawing of operations used to form a two layer molded structure. In FIG. 2, a mold 204 is filled with a material based on a scintillating material such as scintillating phosphor material 208. In one embodiment, scintillating material 208 is erbium doped gadolinium oxysulfite (GOS:Er) available from Osram Sylvania, Towanda, Pa. (Luminescent material type 2611,) and it has been mixed with a UV curable polymer such as UV light curing adhesive # 401 from Dymax. The mold and scintillating material combination is overlaid and pressed onto substrate 212. In an alternate embodiment, scintillating material may be first deposited on substrate 212 and mold 204 pressed into the scintillating material 208. Substrate 212 may include an image sensor array. Alternately, substrate 212 does not include a sensor array and is merely a material transparent to X-rays but blocks, or is coated with a material that blocks or reflects, light. Coated (e.g. aluminum coated) glass is one example of such a substrate. When a coated glass substrate is used, the conversion screen will be inverted and placed over a sensor.

Figure 3:
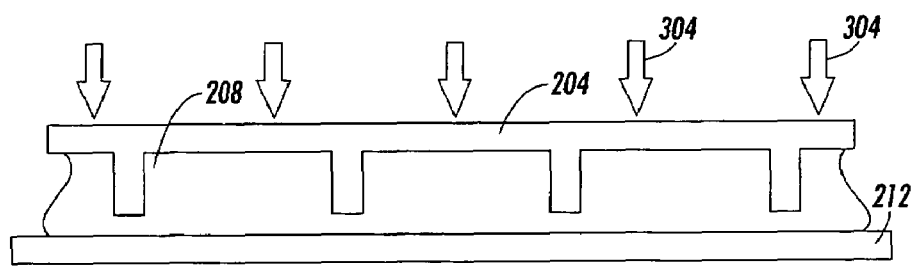

After being pressed into substrate 212, FIG. 3 shows exposing the entire structure to radiation 304. The radiation is typically UV radiation, although other forms of radiation including visible light and e-beam radiation may also be used. When UV radiation is used, the UV radiation cross links the UV curable polymer facilitating scintillating material 208 release from mold 204. To further facilitate the release, the mold may be made from or coated with a low surface energy material. Example mold materials include silicone (such as Sylgard 184 from Dow Corning) or SU-8 (from Microchem Corp.) with a low surface energy coating (such as Cytop from Asahi Glass). In an alternate embodiment, the mold could be made of a metal such as a plated metal. In the previously described method the scintillating material includes a radiation curable polymer as the binder. However other materials may be used as the binder. Examples of other polymer binders include a two-component polymer such as an epoxy polymer or a silicone with catalyst as well as acrylate or urethane based polymers. Example alternative binder materials include thermoplastic materials such as thermoplastic polyesters, polyvinyls, polystyrenes, or high melting point wax. In the case of thermoplastic binder materials the molding would be done with heat.

Figure 4:
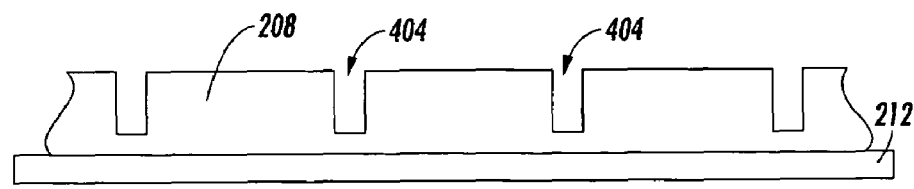
Figure 5:
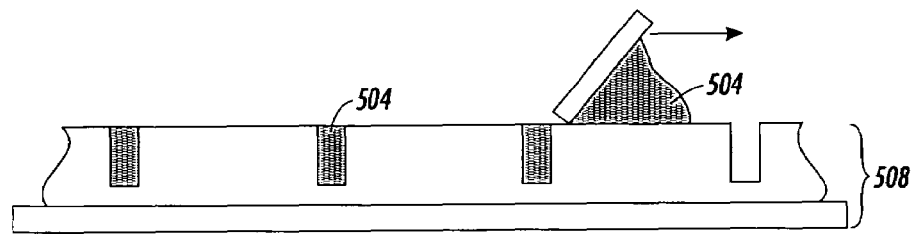

FIG. 4 shows a scintillating material such as phosphorous material 208 after mold 204 removal. The resulting structure includes cavities 404 or cell gaps which are subsequently filled with an opaque material that eventually forms cell walls. Typical spacing between adjacent cell walls range from 30 microns to 2000 microns, more typically, 50 to 700 microns. The cavity width (cell wall thickness) typically ranges between 5 microns and 50 microns. In the embodiment of FIG. 5, a colored polymer such as a pigment based or dyed polymer or a pigment based ink that serves as the opaque cell wall material 504 is doctorbladed into the cavities 404. Other suitable cell wall materials include reflective materials such as silver paste or ink based on reflective metal particles such as aluminum or silver particles or flakes. These materials also include inks or polymers based on nanoparticles such as silver nanoparticles (e.g. nano-silver available from Cabot).

Figure 6:
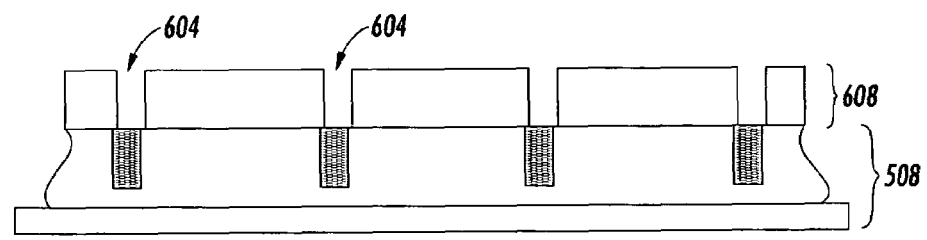

FIG. 6 shows forming a second scintillating material layer such as a phosphor layer over the initial scintillating material layer 508 of FIG. 5. Prior to forming second layer 608, excess cell wall material is carefully removed (e.g. by doctorblading or polishing) from the top of initial scintillating material layer 508. The processes described in FIGS. 2-4 are repeated treating initial scintillating material layer 508 as the substrate and carefully aligning the second mold such that second layer cavities 604 align with cell wall material 504. A thin layer of molded material may remain at the bottom of cavity 604 on top of the walls (similar to that shown for layer 504). However, the thickness of this layer can be kept small (a few microns) by careful process control during molding. It is also possible to etch or dissolve the thin layer after de-molding. Additional cell wall material may then fill cavities 604. By repeating the process, treating the second layer as a substrate and molding subsequent layers over the second layer, scintillating material cells with very high height to width aspect ratios can be formed. Typically height to width aspect ratios exceeding 20 may be achieved for the walls.

FIGS. 7-10 show a potential alternative method of molding an X-ray conversion screen. The procedure is similar to the previously described method of repeatedly molding cavities 604 in scintillating material. However the cavities are filled with a sacrificial material instead of a cell wall material. Removing the sacrificial material leaves behind a series of high aspect ratio cavities.

Figure 7:
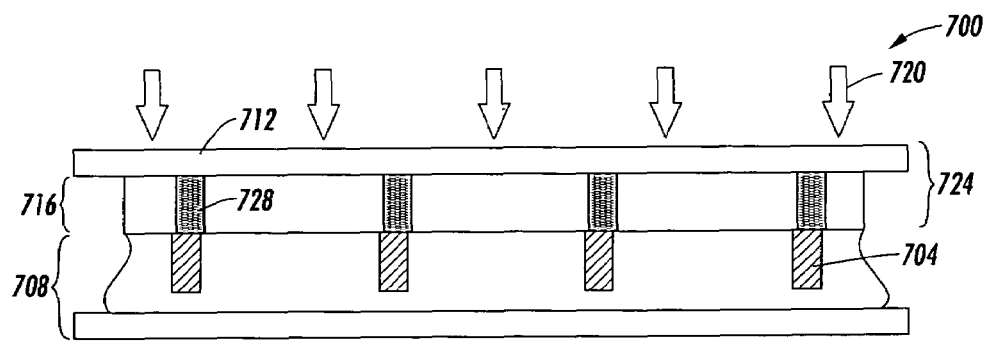
FIGS. 7-11 show a variation on the method that relies on molding a scintillating material and filling the voids with a sacrificial material.

FIG. 7 shows a non-cross linked sacrificial material 704 that fills cavities created in molded first layer 708. A second mold 712 molds a second layer 716 formed over first layer 708. Collimated UV light 720 directed at sample 700 penetrates mold 712 and crosslinks a UV curable compound 724 such as a UV curable acrylic or epoxy-based polymer mixed with a phosphor material such as GOS:Er. In one embodiment, mold 712 includes blocking material 728 that prevents UV radiation from reaching and cross linking sacrificial material 704. In this case the sacrificial material may be the non-crosslinked phosphor-polymer mixture itself.

Figure 8:
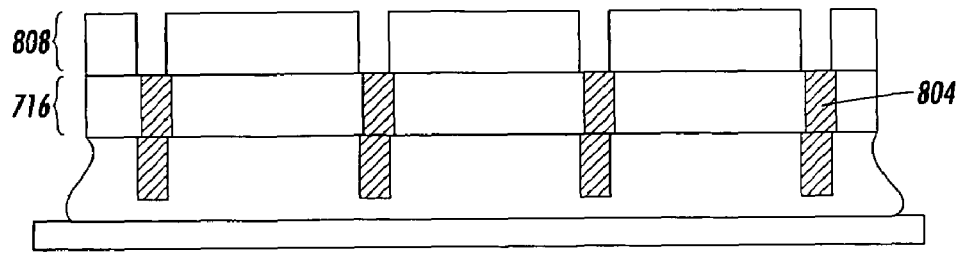

FIG. 8 shows the sample after mold 712 removal and filling of cavities with additional sacrificial material 804. A third layer 808 has been shaped over second layer 716 by molding third layer 808, cross linking a polymer in third layer 808, and removing the mold. The described process may be repeated as needed to reach a desired scintillating material layer thickness.

Figure 9:
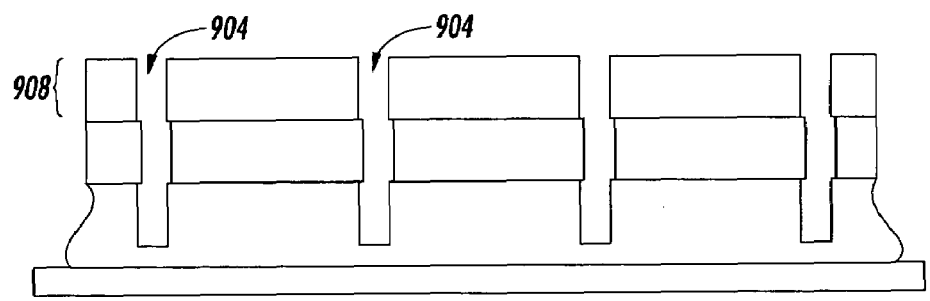
Figure 10:
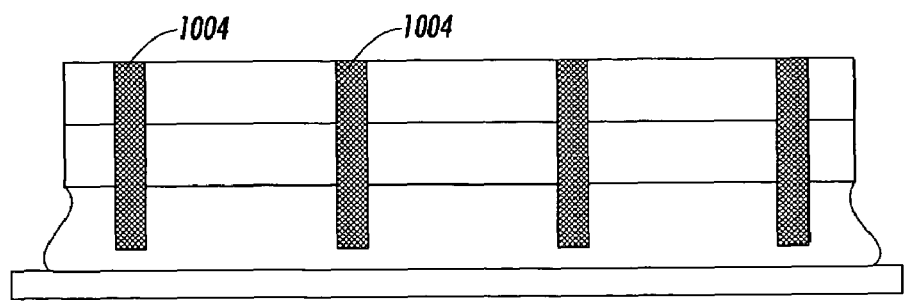

FIG. 9 shows the sample after sacrificial material 704, 804 removal. Sacrificial material removal may be accomplished by etching or by dissolving the sacrificial material in a solution. For example, the sacrificial material could be a water soluble polymer such as PVA or phase-change material such as a wax. The remaining structure includes a series of high aspect ratio cavities 904 surrounded by scintillating material containing layers 908. In one embodiment, an opaque cell wall material 1004 fills these cavities as shown in FIG. 10.

Figure 11:
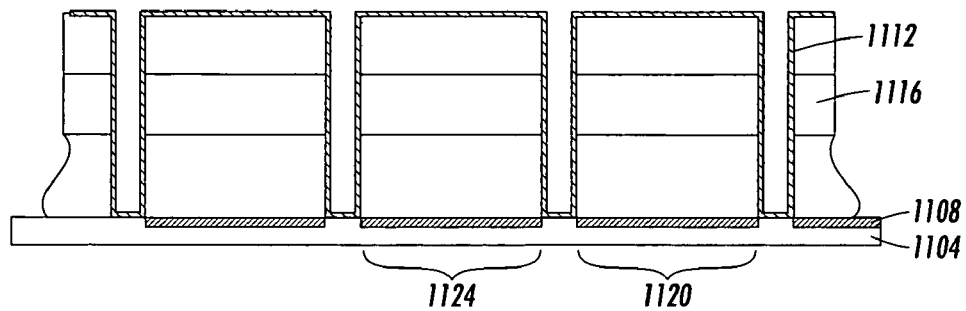

FIG. 11 shows an alternate embodiment in which substrate 1104 includes sensors 1108 that detect visible light. An opaque reflective coating 1112, such as a sputtered metal layer, deposited over the scintillating material 1116 isolates each cell 1120 from adjacent cells 1124. Each isolated cell approximately corresponds to a sensor in substrate 1004. Other methods to deposit material 1112 include electroless plating or deposition of metal nanoparticles from solution.

FIG. 12-14 show a slightly different method of forming high aspect ratio molded scintillating material layers. In FIG. 12, scintillating material layer 1204 is molded over substrate 1208 and a release layer 1212. Molded scintillating material layer 1204 formation may be done using techniques shown in FIGS. 2-4. Alternately, a roll to roll formation method may be used. Roll-to-roll processing, also known as 'web' processing, is the process of creating electronic devices on a roll of flexible plastic or metal foil. As will be seen in FIG. 13, non-rigid substrates make alignment and registration more difficult. The cavities 1216 may be filled with a cell material 1220 as illustrated in FIG. 5 or may remain unfilled.

In FIG. 13, structure 1200 of FIG. 12 is inverted and aligned such that the cavities align with cavities in second scintillating material layer 1308. The first layer top surface is then bonded along a thin bond line 1304 to a second scintillating material layer 1308 top surface 1310. A second substrate 1312 supports a bottom surface 1316 of second scintillating material layer 1308. After bonding, release layer 1212 is activated. Activation may be done using a UV release, a heat release, dissolution, etching, release due to poor adhesion or other well know release methods including laser lift-off. An example of a release polymer is PiRL from Brewer Sciences. FIG. 14 shows the resulting structure 1400 after release including the thick molded scintillating material layer.

Although an improved method of forming a thick X-ray conversion screen has been described, the described conversion screen still produces Swank noise. As previously described, Swank noise results from the unequal propagation of light photons within the scintillator. In particular light generated by X-rays at the top of the X-ray conversion screen provides weaker contribution to the sensor signal than light generated at the X-ray conversion screen bottom. This is because light generated at the screen top has a higher probability of being scattered and re-absorbed prior to reaching the sensor than light generated towards the conversion screen bottom.

One method of minimizing Swank noise uses transparent light guides to guide scintillating material generated light through the pixel to the detector. Guiding the light minimizes the probability of scattering and absorption for light generated at the conversion screen top. FIGS. 15-18 show one method of forming a scintillating material layer such as a phosphor layer including such light guides.

Figure 15:
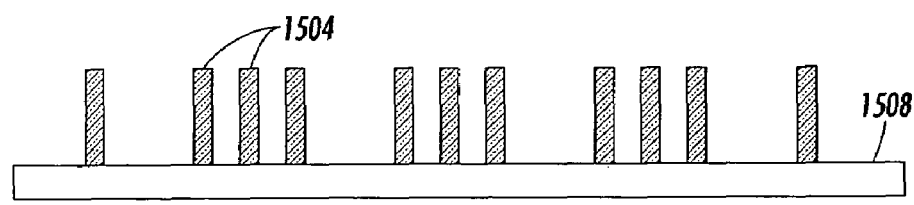
FIGS. 15-18 show a method of forming transparent light guides in a molded conversion screen to minimize the effects of Swank noise.

In FIG. 15, transparent light guides 1504 are formed over a substrate 1508. In one embodiment, the transparent light guides are molded from a material such as a transparent polymer (such as optical polymers 60 or 68 from Norland Products, Inc.) although other methods of forming transparent light guides are available.

Figure 16:
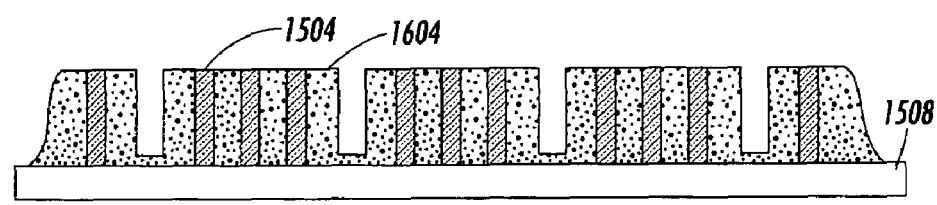
Figure 17:
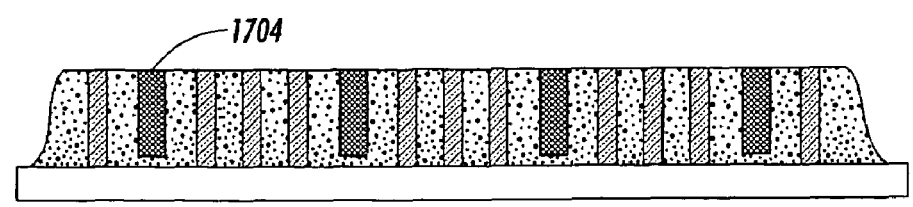
Figure 18:
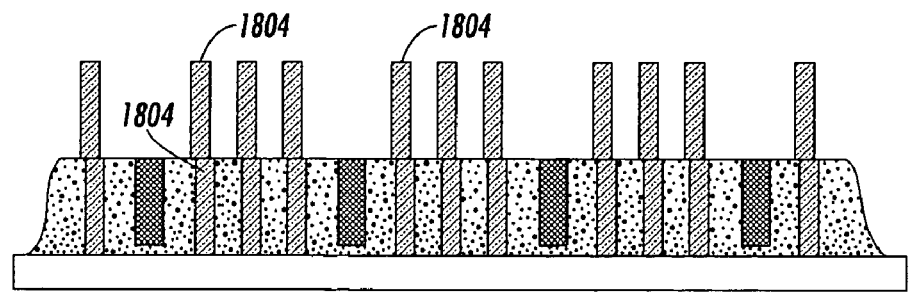

FIG. 16 shows scintillating material 1604 deposited over transparent light guides 1504. In one embodiment, scintillating material 1604 includes molded cavities filled with opaque cell wall material 1704 as shown in FIG. 17. FIG. 18 shows "extending" the light guides by molding additional light guides 1804 over prior light guides 1804. The procedures shown in FIGS. 16 and 17 may then be repeated to form a second scintillating material detection layer including opaque cell walls and transparent light guides.

Although various dimensions are possible, usually each cell corresponds to a sensor, thus the dimensions are approximately commensurate with a sensor dimension or some fraction thereof. Example cell dimensions typically include a width between 50 and 1000 microns and a height between 100 microns and 5000 microns. Smaller cells would typically have a lower height, e.g. 100 micron wide cells could be 300-500 microns tall and wider cells would typically be higher. The height of the cells depends on the X-ray energy, for higher energy X-rays taller cell structures are required. Each cell may also include one or more light guides 1804 to guide light generated at the top of a scintillating material layer to the sensor thereby minimizing Swank noise effects.

Figure 19:
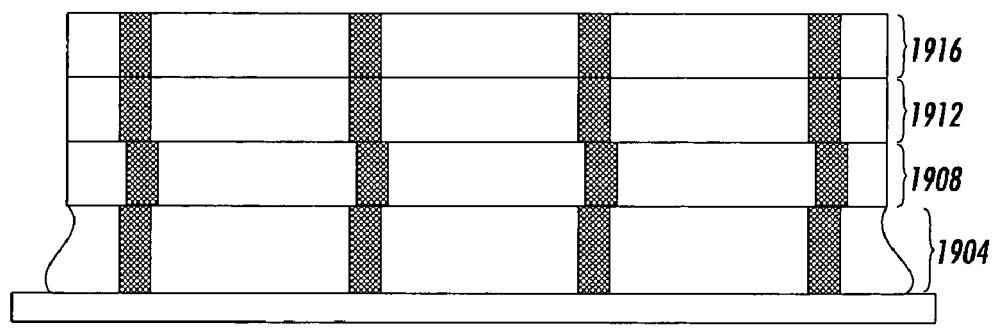
FIGS. 19-21 show modifications by forming changing the parameters in different layers of the conversion screen to minimize the effects of Swank noise.
Figure 20:
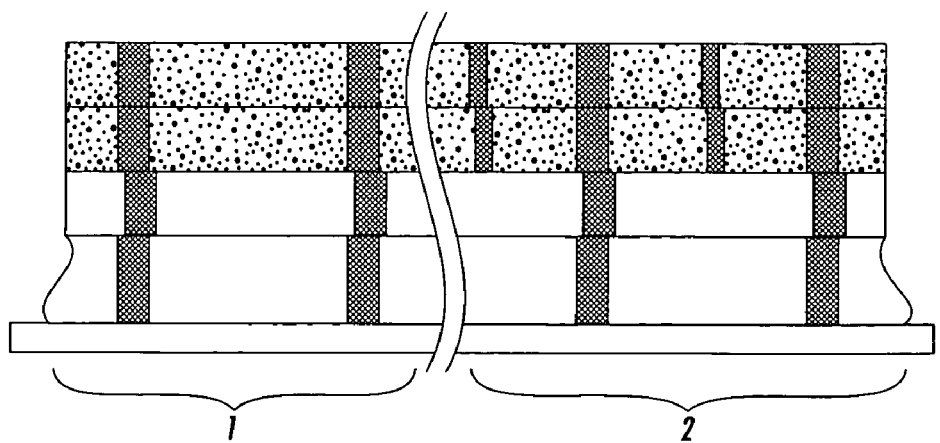

Although light guides are ideal for minimizing Swank noise, other methods may also be used. FIG. 19 shows using different layer thickness, and part of FIG. 20 shows using different materials. FIG. 19 shows a four level system in which different layer thickness and material variations, in this case different scintillating material such as phosphor concentrations, are used in layers 1904, 1908, 1912, and 1916. In particular, to compensate for a lower signal contribution of light which is generated in the upper layers due to scattering and re-absorption, the concentration of scintillating material in the screen lower layers may be decreased to balance the contribution of light originating from upper and lower layers. Also, the kind of scintillating material may differ from layer to layer. For example, upper layers may carry a phosphor with a higher conversion efficiency. Lower phosphor layers may have particles which are transparent to light, such as glass beads or fibers, mixed in.

Molding fabrication techniques also enable other variations in different X-ray screen layers. For example, FIG. 20 shows changing the density of cell walls in different layers. By increasing the density of cell walls at the top of the screen the excessive spreading of light that is generated in the top layers can be reduced. Light that is generated in lower layers illuminates a smaller sensor area and therefore a lower wall density is required. This scenario can be of importance if the photo sensor pixels are smaller than the lower cells (which are closer to the sensor) of the scintillating material screen. When the sensor pixels are significantly smaller than the cells of the scintillating material screen alignment may not be required.

Figure 21:
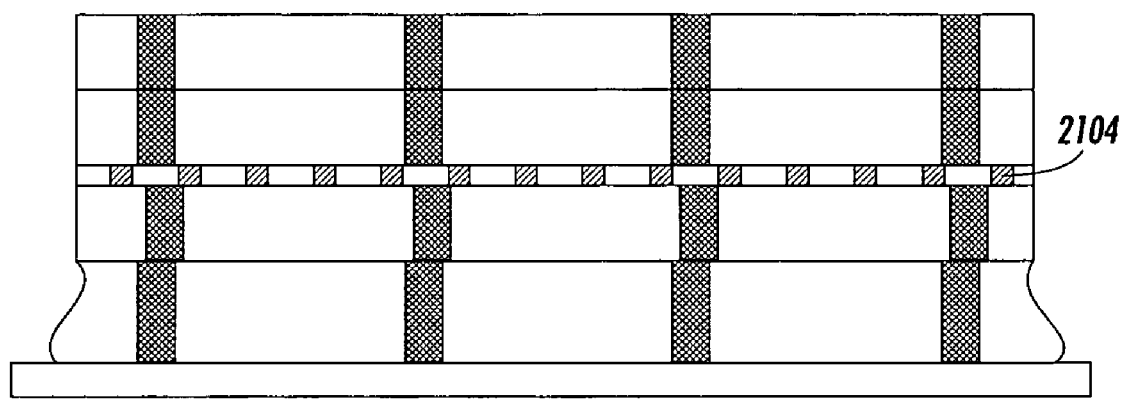

In FIG. 21, a conductive grid layer 2104 is inserted to capture or deflect electron charges generated in the scintillator. Electrons are generated when the X-rays interact with the scintillating material. Some of these electrons may interfere with the readout circuitry underneath the scintillating material screen. It may therefore be advantageous to embed a conductive grid structure into the scintillating material screen so that some of the electron charge can be conducted away. Examples of conductive grid fabrication methods include but are not limited to sputtering of metal and subsequent photolithographic patterning, printing conductive inks, plating methods or molding a conductive grid using a material such as a carbon-filled polymer.

The preceding description includes numerous examples and details to describe improved methods of fabricating an X-ray conversion screen as well as reducing Swank noise. For example, various materials such as phosphor for a scintillating material, dimensions such as height width ratios and fabrication techniques such as doctorblading have been provided. These details have been provided as examples to facilitate understanding of the invention and should not be used to limit the scope of the invention. Thus, the invention should only be limited by the claims, as originally presented and as they may be amended to encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of forming an X-ray conversion screen comprising the operations of:
   forming a substrate;
   forming a first set of conversion screen material on a substrate, the conversion screen material including a scintillating material;
   bringing a first mold in contact with the conversion screen material such that the first mold molds the conversion screen material;
   removing the first mold such that cavities remain in the conversion screen material, at least some of the cavities positioned to separate adjacent pixels, the conversion screen material forming a first layer of the conversion screen;
   filling the cavities with a first filler material;
   bringing a second mold in contact with a second set of conversion screen material such that the second mold molds the second set of conversion screen material, an opposite side of the second set of conversion screen material attached to the first layer of the conversion screen;
   removing the second mold such that a second set of cavities remain in the second set of conversion screen material, at least some of the cavities aligned with the filler material.

2. The method of claim 1 further comprising the operation of:
   filling the second set of cavities with a second filler material, the density of cavities in the second mold different from the density of cavities in the first mold such that the density of cavities is higher in layers closer to an X-Ray source being detected.

3. The method of claim 2 wherein the filler material is a reflective cell wall material.

4. The method of claim 3 wherein the filler material is an opaque material.

5. The method of claim 1 further comprising the operation of filling the second set of cavities with a reflective cell wall material.

6. The method of claim 1 wherein the substrate includes a plurality of sensors for detecting visible light with a wavelength ranging between 400-800 nm.

7. The method of claim 6 wherein the sensors are positioned between the location of adjacent filled cavities.

8. The method of claim 1 wherein the substrate is glass coated with a reflective material.

9. The method of claim 1 wherein the substrate includes a plurality of transparent waveguides oriented in a direction approximately perpendicular to a surface of the substrate.

10. The method of claim 1 further comprising depositing a metal material over the scintillating material layer, the metal material to reflect light generated by the scintillating material.

11. The method of claim 1 further comprising attaching the X-ray conversion screen to a sensor array.

12. The method of claim 1 wherein the walls of the cavities are coated with a reflective or opaque material and the cavities remain unfilled.

13. The method of claim 1 wherein the concentration of scintillating material in the first conversion screen material on the substrate and the concentration of scintillating material in the second set of conversion screen material is different, the conversion screen designed such that the higher concentration of scintillating material is positioned closer to a source of X-rays being detected.

14. The method of claim 1 wherein the distance between cavities in the first set of conversion screen material exceeds the thickness of the first set of conversion screen material.

15. A method of forming an X-ray conversion screen comprising the operations of:
   forming a substrate;
   forming a conversion screen material on a substrate, the conversion screen material including a scintillating material;
   bringing a first mold in contact with the conversion screen material such that the first mold molds the conversion screen material;
   removing the first mold such that cavities remain in the conversion screen material, at least some of the cavities positioned to separate adjacent pixels, the conversion screen material forming a first layer of the conversion screen;
   forming a second substrate including a release layer;
   bringing a second mold in contact with a second set of conversion screen material such that the second mold molds the second set of conversion screen materials, an opposite side of the conversion screen material to attach to the release layer of the second substrate, the second set of conversion screen material forming a second scintillating material layer;
   removing the second mold such that cavities remain in the second scintillating material layer;
   bonding the molded surface of the first layer to the molded surface of the second layer; and,
   using the release layer to release the second substrate from the second scintillating material layer.

16. The method of claim 15 further comprising the operation of:
   forming a third substrate including a release layer;
   bringing a third mold in contact with a third set of conversion screen material such that the conversion screen material forms a molded surface that mirrors a molding surface of the third mold, an opposite side of the conversion screen material to attach to the release layer of the third substrate, the third set of conversion screen material forming a third scintillating material layer;
   removing the third mold such that cavities remain in the third scintillating material layer;
   bonding the molded surface of the third layer to the second layer such that the cavities in the third layer approximately match the cavities in the second layer; and,
   using the release layer to release the second substrate from the second scintillating material layer.

17. The method of claim 15 wherein the conversion screen material forms a molded surface that mirrors a molding surface of the second mold; and,
   filling the cavities in the second scintillating material layer with the filler material.

18. A method of forming an X-ray conversion screen comprising the operations of:
   forming a substrate;
   forming a conversion screen material on a substrate, the conversion screen material including a scintillating material;
   bringing a first mold in contact with the conversion screen material such that the first mold molds the conversion screen material;
   removing the first mold such that cavities remain in the conversion screen material, at least some of the cavities positioned to separate adjacent pixels, the conversion screen material forming a first layer of the conversion screen;

forming a second substrate including a release layer;

bringing a second mold in contact with a second set of conversion screen material such that the conversion screen material forms a molded surface that mirrors a molding surface of the second mold, an opposite side of the conversion screen material to attach to the release layer of the second substrate, the second set of conversion screen material forming a second scintillating material layer;

removing the second mold such that cavities remain in the second scintillating material layer;

filling the cavities in the second scintillating material layer with an opaque material;

bonding the molded surface of the first layer to the molded surface of the second layer; and using the release layer to release the second substrate from the second scintillating material layer.

19. A method of forming an X-ray conversion screen comprising the operations of:

forming a substrate;

forming a conversion screen material on a substrate, the conversion screen material including a scintillating material and a radiation-crosslinkable polymer mixed with the scintillating material;

bringing a first mold in contact with the conversion screen material such that the first mold molds the conversion screen material;

removing the first mold such that cavities remain in the conversion screen material, at least some of the cavities positioned to separate adjacent pixels, the conversion screen material forming a first layer of the conversion screen.

20. The method of claim 19 further comprising:

the operation of exposing the polymer to radiation to cross link the polymer prior to removal of the mold.

21. A method of forming an X-ray imaging system comprising the operations of:

molding a first layer of X-ray conversion material including a first concentration of scintillating material with a first mold to form a first layer of an X-ray conversion screen;

filling in cavities to form an approximately planar surface of the first layer of the X-ray conversion screen;

molding a second layer of X-ray conversion material including a second concentration of scintillating material with a second mold over the first layer;

filling in cavities to form an approximately planar surface of the second layer of the X-ray conversion screen; and, positioning the X-ray conversion screen over a sensor array such that X-rays striking the X-ray conversion screen are converted into light which is detected by the sensor array, the X-ray conversion screen designed such that the layer of the conversion screen having a lower concentration of scintillating material is positioned further from a source of X-rays being detected.

* * * * *